July 21, 1959
R. J. PAGLIUSO
2,895,697
MOUNTING POST
Filed Oct. 17, 1955
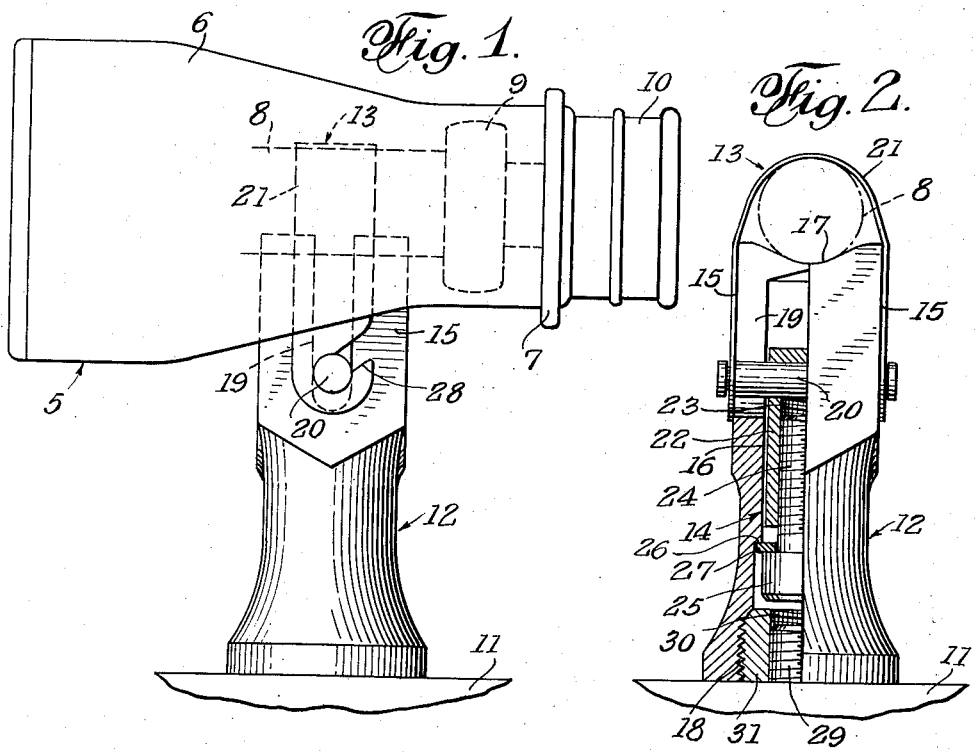
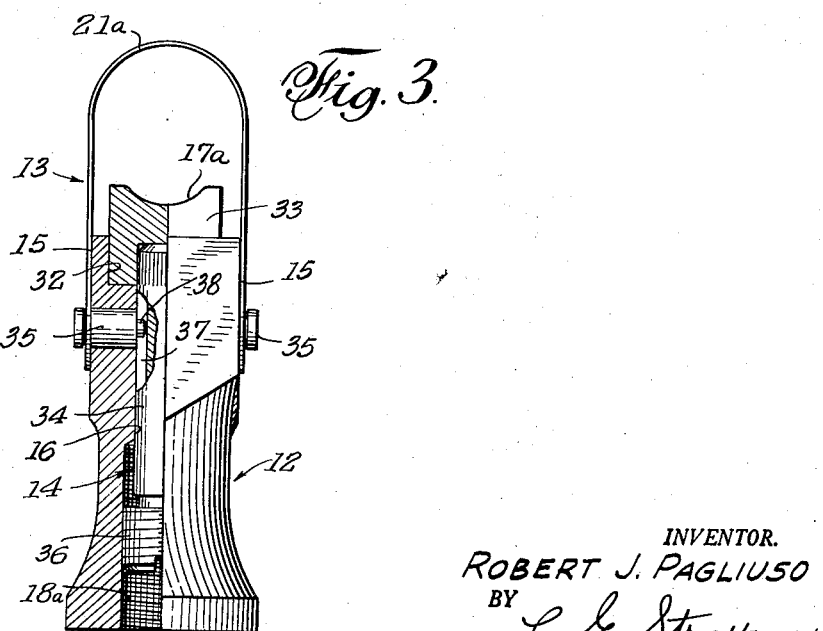
INVENTOR.
ROBERT J. PAGLIUSO
BY
C. G. Stratton
ATTORNEY

United States Patent Office 2,895,697
Patented July 21, 1959

2,895,697

MOUNTING POST

Robert J. Pagliuso, Glendale, Calif.

Application October 17, 1955, Serial No. 540,694

8 Claims. (Cl. 248—187)

This invention relates to a mounting post and deals more particularly with a post structure for mounting viewing instruments, such as binoculars. The present invention is particularly adapted for use in holding binoculars in front of the lenses of cameras, whether of the single lens or stereoscopic type, to transmit enlargements of the subject to be photographed to the camera lenses. In the case of single lens cameras, one side of the binoculars may be used for sighting the subject, while the other side is aligned with the camera lens. The invention may also be used for mounting binoculars or opera glasses on uniped supports and, thus, be more readily manipulated and held in viewing position than when held directly in the hand.

An object of the present invention is to provide a mounting post having the foregoing and analogous uses and adapted for facile mounting connection with binoculars or similar viewing instruments.

Another object of the invention is to provide a mounting post that embodies novel means for effecting clamping engagement with the connecting tube of a pair of binoculars while leaving the adjusting knob thereof freely accessible to the user.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, preferred embodiments of the present invention, which are given by way of illustration or example only.

In the drawing, like reference characters designate similar parts in the several views.

Fig. 1 is a side elevational view of a mounting post according to the present invention, in operative position mounting a pair of binoculars.

Fig. 2 is an elevational view, in quarter section, of said post as rotated 90° relative to the elevation of Fig. 1.

Fig. 3 is a similar view of a modification.

Fig. 1 shows a conventional pair of binoculars 5, the same being provided with optical housing tubes 6 connected in transverse relation by a bridge 7. Said bridge is connected to a tube 8 between the optical tubes 6 and the latter mounts an adjusting knob 9 by means of which the lens tubes 10 may be telescopically adjusted with respect to said optical tube 6. The present post structure is adapted to clamp tube 8 and thus mount the binoculars in fixed relation to a base 11 and to a camera or other instrument mounted thereon.

The mounting post that is illustrated in two forms thereof comprises, generally, a housing 12, clamp means 13 carried by said housing, and adjusting means 14 within the housing, to operate the clamp means.

The housing 12, in the form of Figs. 1 and 2, has a post-like form and the upper end thereof is preferably provided with opposite flat sides 15. An internal longitudinal bore 16 terminates short of the upper end which is provided with a seat 17 that may accommodate the tube 8 of the binoculars 5, or a similar cylindrical member. Said seat extends in a direction between the sides 15. The lower end of bore 16 is provided with a threaded counterbore 18.

The upper end of said housing 12 is bifurcated by a slot 19 that extends downward from seat 17, said seat being divided but, nevertheless, having an area effective to engage binocular tube 8.

The clamp means 13 comprises a pin 20 extending transversely in slot 19 and adapted to freely move therealong. The ends of said pin extend outwardly beyond the housing sides 15 and connect to the ends of a flexible band or strap 21 that forms a loop disposed above the seat 17.

The adjusting means 14 is shown as a member 22 disposed in bore 16, the pin 20 extending transversely through the upper end thereof. Said member 22 is internally threaded at 23 for the threaded shank 24 of a screw having a head 25. Said head may be engaged with a shoulder 26 formed in bore 16, or, as shown, said shoulder may be engaged with a washer 27 which, in turn, is engaged with said shoulder.

Rotation of the screw causes extension or retraction of member 22, according to the direction of rotation of said screw, thus causing the loop of band 21 to be pulled toward or to be slacked off from seat 17. It will be clear, therefore, that manipulation of the means 14 will effect clamping of member 8, as in Fig. 2, or release thereof. One or both ends of the band may be provided with a hook 28 providing a slot or eye removably receiving the pin 20 to enable separation of the band from pin 20 so that the binoculars 5 may be removed from the post.

The base 11 usually is provided with a threaded stud 29. Accordingly, the present post is provided with a threaded seat 30 that is adapted to receive such stud. In this case, seat 30 is formed in a plug 31 engaged with the threads of counterbore 18.

In the above-described form, the seat 17 is relatively immovable and the band 21 is tightened relative thereto. In the modification of Fig. 3, the seat 17a is moved relative to the band 21a to effect clamping.

In the modification, the housing is shown with an upper recess or cavity 32 in which is received a block 33 having seat 17a formed therein. A member 34 has said block 33 affixed thereto and is slidingly fitted in housing bore 16.

The band 21a has its ends connected to pins 35 pressfitted into the housing 12 and extending outwardly from the housing sides 15.

The above-described clamp means 13 of Fig. 3 is adjusted by the means 14, shown as a threaded plug 36 in the counterbore 18a of bore 16. Said plug engages the lower end of member 34 to cause projection of the block 33 thereon and movement of seat 17a toward the loop of band 21a. In the event that said block may leave recess 32, the rotation of the block may be obviated by providing said member 34 with a longitudinal keyway and one of the pins 35 with a key 38 extending into said keyway.

The threads 18a of the counterbore serve the same purpose as the threads 30 of the earlier form of the invention.

While the foregoing has illustrated and described what are now contemplated to be the best modes of carrying out my invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described my invention, what I claim and desire to secure by Letters Patent is:

1. A mounting post comprising a housing having a longitudinal bore therein, said housing being provided with opposite flat sides, clamping means comprising a relatively movable seat and clamp band, said band having ends engaged flatwise with said housing sides with the mentioned seat extending in a direction between the flat sides, means for connecting and disconnecting a band end with the housing, and means disposed within said bore to operate the clamping means to adjust the relative positions of the seat and band.

2. A mounting post according to claim 1: the mentioned seat being formed on the housing, and the band being adjustable relative to the seat.

3. A mounting post according to claim 1: the band having ends connected to the housing, and a member movable in the bore of the housing and provided with the mentioned seat.

4. A mounting post comprising an elongated housing having an end support face and a longitudinal bore terminating at said end in a threaded counterbore for connection to a base adapted to engage said face, a seat provided on the opposite end of the housing and a slot in the housing opening on said seat, a clamping band having a loop overstanding the seat, said band having free ends trained along opposite sides of the housing, a member disposed in and movable in said bore and having means for connecting and disconnecting the band ends, said latter means extending transversely through said slot and in hooking engagement with the band ends, and means to project and retract said member and the transversely extending means to move the loop of said band relatively to said seat, said latter means comprising a threaded member accessible only through the mentioned counterbore when the housing is disconnected from its support base.

5. A mounting post according to claim 4 in which the bore is inward of the counterbore and provided with an abutment intermediate its ends, the threaded member having a head in endwise engagement with the abutment and held thereby against endwise movement in the bore during movement of the band loop relative to the seat.

6. A mounting post comprising an elongated housing having a longitudinal bore terminating at one end in a threaded counterbore, a clamping band having ends connected to opposite sides of the housing and forming a loop overstanding an end of the housing, a member disposed in said bore and having a portion extending toward said loop and provided with a seat, and means to project and retract said member to move the seat relatively to the band loop, said means being engaged with the threaded counterbore.

7. A mounting post according to claim 1: in which the means disposed within the bore comprises a member movable longitudinally within the bore and screw means connected to said member for moving the same.

8. A mounting post according to claim 7: in which the screw means is threadedly connected to the movable member, and in which the member is connected to the clamping means.

References Cited in the file of this patent

UNITED STATES PATENTS

| | | |
|---|---|---|
| 32,249 | Hughes | May 7, 1861 |
| 249,125 | Vossler | Nov. 1, 1881 |
| 1,008,909 | Higgins | Nov. 14, 1911 |
| 1,297,802 | Dambruch | Mar. 18, 1919 |
| 1,408,900 | Miller et al. | Mar. 7, 1922 |
| 1,659,576 | Brady et al. | Feb. 21, 1928 |
| 2,515,484 | Zaleski | July 18, 1950 |
| 2,671,625 | Buckley | Mar. 9, 1954 |

FOREIGN PATENTS

| | | |
|---|---|---|
| 5,808 | Great Britain | Mar. 7, 1914 |